Oct. 30, 1956    J. H. MILLER    2,768,700
SAFETY AIR BRAKE SYSTEM FOR MOTOR VEHICLES
Filed July 5, 1950    2 Sheets-Sheet 1
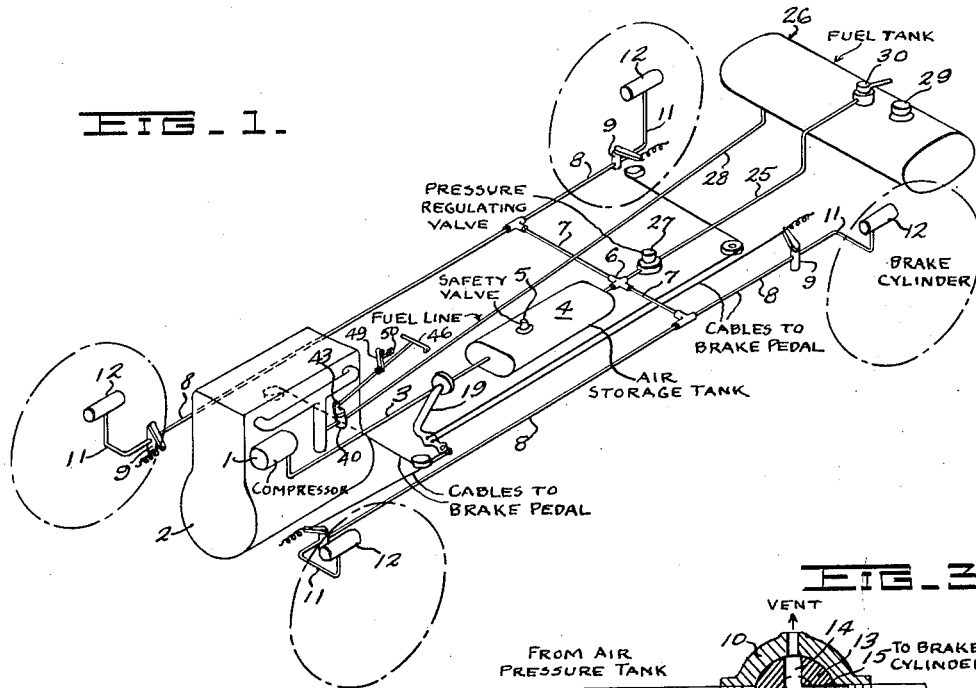
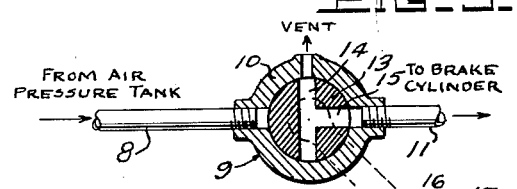
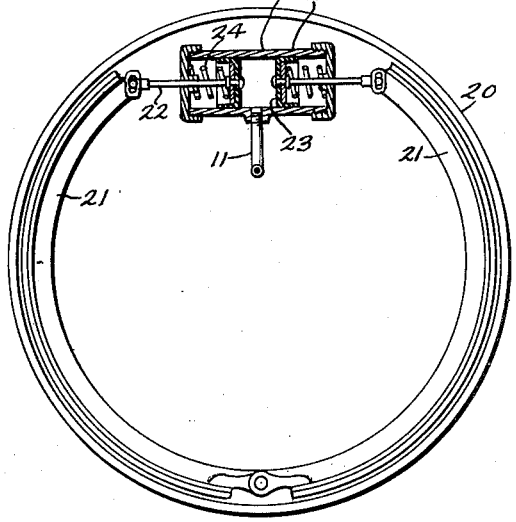
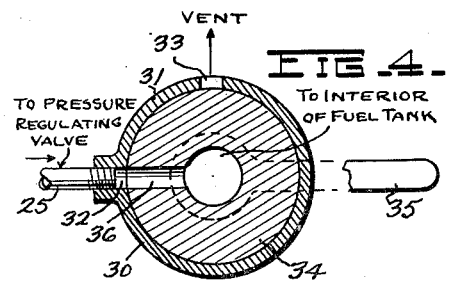
Inventor
JAMES H. MILLER
By Leo L. Townshend
ATTORNEY

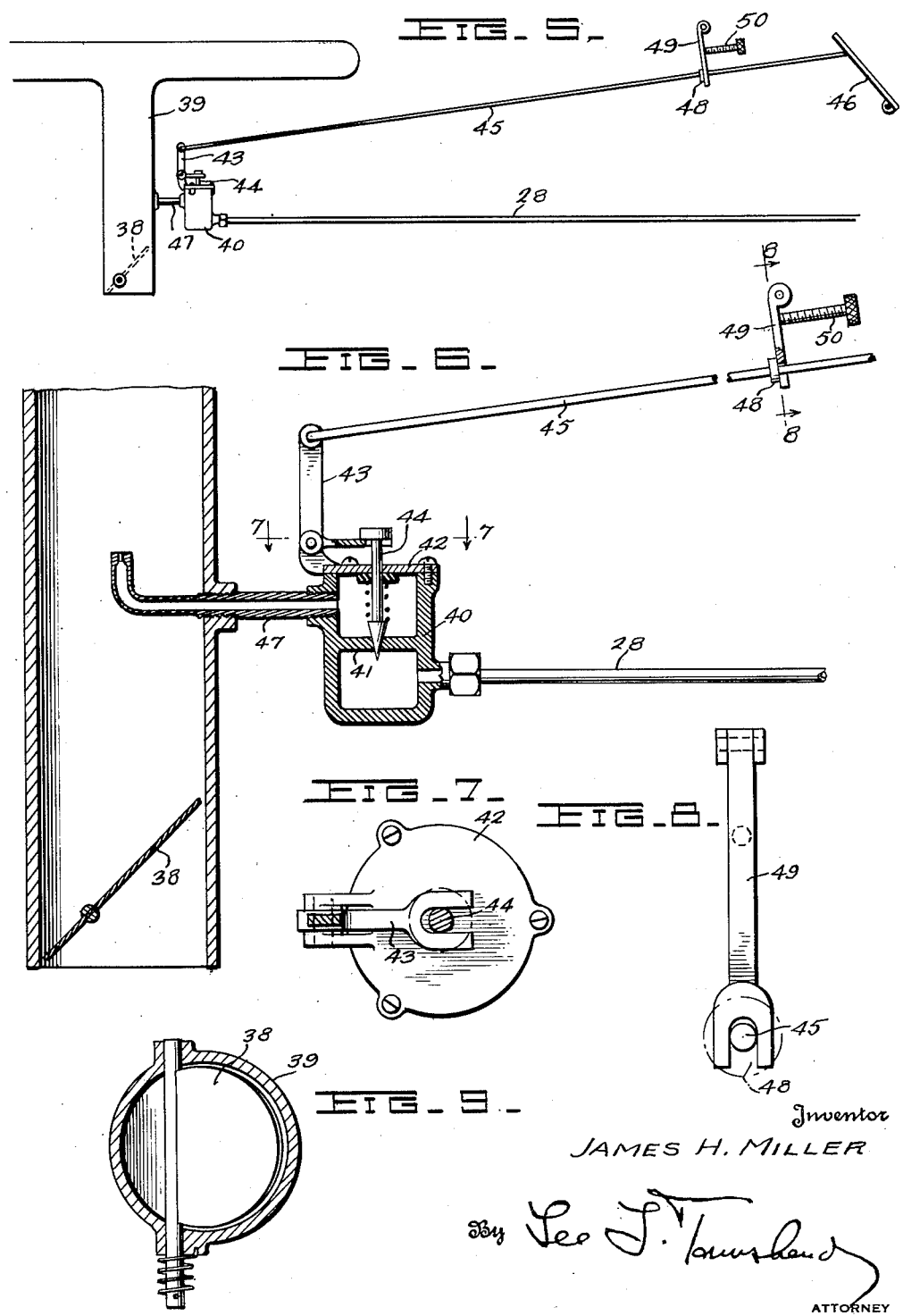

2,768,700

SAFETY AIR BRAKE SYSTEM FOR MOTOR VEHICLES

James H. Miller, Kennett, Mo.

Application July 5, 1950, Serial No. 172,163

1 Claim. (Cl. 180—82)

This invention relates to a safety device for air brake equipped motor vehicles and the primary object of the invention is to stop the motor in case of a leak or break in the air lines that prevents effective braking of the vehicle.

Another object of the invention is to provide an air brake system for motor vehicles that utilizes part of the air brake pressure to feed fuel to the motor and in which the feed is automatically rendered inoperative by the pressure drop due to a leak or break in the air brake lines.

A further object of the invention is to provide an air brake system for motor vehicles having as a cooperative adjunct an air pressure feed to the gasoline tank to supply the fuel under pressure to the motor.

These and other objects of the present invention will appear as the following description thereof proceeds, and in order to more clearly understand the invention, reference may be had to the accompanying drawings in which an embodiment of the invention is shown.

In the drawings:

Figure 1 is a general diagrammatic view of the system as applied to a motor vehicle with only the motor and fuel tank of the vehicle shown in full lines and with the wheels in dotted lines, Figure 2 is an elevation of one of the wheel brakes employed with the brake cylinder in section, Figure 3 is a horizontal section of one of the brake operating valves, Figure 4 is a horizontal section of the cut-off valve at the pressure inlet to the top of the fuel tank, Figure 5 is an elevation of a form of carbureting apparatus employed with this invention, Figure 6 is a generally similar view with certain parts in section, Figure 7 is a section on the line 7—7 of Figure 6, Figure 8 is a section on the line 8—8 of Figure 6, and Figure 9 is a top plan view of the air valve in position.

Air brakes for motor vehicles are well known but one of the disadvantages of employing such a braking system is that upon a leak or breakage in the air lines the system becomes inoperative without knowledge to the vehicle operator. Such a defect is overcome in this invention by providing a safety automatically operated cut-off for the fuel feed to the motor, controlled by the air brake system which will prevent operation of the vehicle should the brakes become inoperative for the reason aforesaid.

The air brake system disclosed comprises a compressor 1, driven by the motor 2, usually by a fan belt connection not shown, which feeds air by the conduit 3 to an air storage tank 4, provided with a safety valve 5 to maintain a certain predetermined air pressure therein. Air is fed to a cross connection 6 and hence by cross pipe lines 7 to side pipe lines 8 connected at each end to control valves 9 for each wheel.

One control valve 9 is illustrated in Figure 3. Each valve comprises a circular casing 10, having three annular spaced openings, one connected with the side pipe line 8, the next with a conduit 11, leading to an adjacent wheel brake cylinder 12 and the third being an atmospheric vent. Within the valve casing is an annular rotatable valve body 13, with a diametrical cross port 14 and separate radial port 15 connected therewith. The valve body is rotated by a lever 16, biased by a spring 17 to the position as shown in Figure 3. Each lever is operated by a cable 18 running to a vehicle carried foot pedal 19. The cables to operate the valves for the front and rear wheels are connected to the foot pedal at opposite sides of its fulcrum. Obviously the cables may be replaced by rods, links or other connecting means between the foot pedal 19 and levers 16.

The brake for each wheel as shown in Figure 2 comprises a conventional wheel mounted drum 20, with pivoted internal brake shoes 21. The opposite free ends of the shoes carry rods 22 of opposed pistons 23 in the interposed brake cylinders 12 and are biased by springs 24 to "off" position. The conduit 11 of each control valve 9 leads to the cylinder at a point between the pistons.

In the air brake system thus described with the valves 9 in the position shown in Figure 3, the brakes are off as the brake cylinders are vented to the atmosphere through the conduit 11, ports 14 and 15 and control valve vent. When the control valve levers 16 are moved to rotate the valve body 90° by depression of the pedal 19 and pull on the cables 18, the port 14 connects the loaded side pipe lines 8 with the conduit 11 and air under pressure is fed to each cylinder 12 to move the pistons 23 outwardly and apply the brakes as is obvious. Release of the brake pedal 19 and spring return of the valve body to the position shown in Figure 3 will release the brakes as is apparent.

The safety feature of this invention resides in taking off air pressure from the system described and utilizing the same as a pressure feed for fuel to the vehicle motor 2. This is accomplished by providing an air pipe 25 leading from one arm of the cross connection 6 that is connected with the air storage tank 4 to the top of the fuel tank 26 of the vehicle. In this line is a conventional pressure regulating valve 27 that maintains a constant regulated pressure head on the fuel within the tank 26. This pressure head forces fuel through the conduit 28 from the bottom of the fuel tank to carbureting means hereinafter described on the motor 2. The fuel tank has an air-tight inlet cap 29, and a special cut-off valve 30, shown in Figure 4, connects the pipe 25 with the fuel tank.

The cut-off valve 30 comprises an annular casing 31 having openings 32 and 33. The opening 32 is connected to the terminal of the pipe 25 and the opening 33 is merely an atmospheric vent. The valve body 34 is rotatable in the casing by a handle 35 and has a radial passage 36 connecting with a central bore leading only to the interior of the fuel tank.

The fuel tank 26 is normally air sealed to maintain the feed pressure head. In refilling the tank the cut-off valve 30 is turned by the handle 35 to a position at right angles to that shown in Figure 4. This will close off the air pipe 25 to the tank and release the pressure head through the vent 33. When the tank has been refilled and the cap 29 is replaced, the cut-off valve 30 is returned to the position shown in Figure 4 to place the air pressure head on the fuel for feeding purposes through the pipe line 25 and regulating valve 27.

The air brake system disclosed maintains normally a constant pressure feed of fuel to the motor. However, should there at any time develop a leak or break in the air lines that feed air to the brake cylinders no appreciable air pressure will be available for the auxiliary air pipe 25 through the pressure regulating valve 27 to the fuel tank 26. Consequently the pressure head will drop in the tank below a point required to feed the fuel to the motor and the motor will automatically stop the motor for lack of fuel to operate further. The operator will then know the air brake system is not in working order.

As it is necessary for proper functioning of this invention that the fuel feed to the motor cease almost simultaneously with the drop of pressure in the tank, there is illustrated in Figures 5 to 9 a carbureting mechanism that will accomplish this result yet permit a constant pressure feed fuel vaporization when the parts of the assembly are in normal position. This disclosure merely represents a preferred form for accomplishing this result but it is obvious various other mechanisms may be utilized for the same purpose.

The carbureting mechanism disclosed comprises an automatic air valve 38 essentrically mounted in the air inlet end of the motor manifold 39 and spring urged to a position that merely permits sufficient air to be drawn in the manifold for idling speeds. At higher speeds the valve 38 automatically opens to admit additional air required. A small shallow carbureter well 40 is divided into two chambers by the partition 41 and the lower chamber is connected with the fuel pressure feed line 28 by suitable means. A closure 42 for the upper chamber of the well carries a bell crank lever 43 connected with a spring urged needle valve 44 adapted to be urged to seat in an opening in the partition 41. The upper end of the lever 43 has a connection 45 to the accelerator pedal 46 of the vehicle. A fuel jet 47 extends from the upper chamber of the well 40 through and into the manifold 39.

When the accelerator pedal 46 is depressed the bellcrank lever will lift the needle valve 44 and a proportionate amount of fuel is fed from the lower chamber of the well 40 to the upper chamber and hence through the fuel jet 47 into the manifold. The automatic air valve controls the required air fed for the desired speed. As soon as the pressure drops in the tank no fuel is fed through the line 28 and almost simultaneously the motor stops due to lack of fuel.

During normal operation of the motor with the brakes properly functioning, it is necessary to feed a slight amount of fuel for idling speeds. To prevent the needle valve 44 from entirely closing access from the lower chamber to the upper chamber of the well 40, there is provided a stop collar 48 on the connection 45 engageable with a swing stop arm 49 mounted in a stationary part of the vehicle and adjustable by a screw 50. This permits a suitable adjustment for the needle valve 44 to feed fuel for any desired idling speed of the motor.

I claim:

A safety device for an automobile including a combustion motor and a spaced fuel tank, an air storage tank, means operable by the motor to supply air thereto, air brakes for each wheel of the vehicle, means to supply air from the tank to the wheel brakes or exhaust the same therefrom, a by-pass line to supply air from the air tank to the top of the fuel tank to place the fuel under pressure, a pressure regulating valve in said line, a fuel conduit leading from the bottom of the fuel tank to the motor including a direct feed carbureting system for the motor, whereby air pressure drop in the fuel tank disrupts the flow of fuel thereby stopping said motor, a valve casing on the fuel tank having spaced openings, a valve body rotatable in said casing having a central bore connected with the interior of the fuel tank and a radial passage therefrom to its outer edge, and means to manually rotate said body to connect the bore of the valve with the by-pass line through one opening and to vent the fuel tank through the other opening.

References Cited in the file of this patent
UNITED STATES PATENTS

| | | |
|---|---|---|
| 1,060,791 | Schaller | May 6, 1913 |
| 1,127,822 | Sturtevant | Feb. 9, 1915 |
| 1,179,387 | Anschutz | Apr. 8, 1916 |
| 1,737,161 | Jupp | Nov. 26, 1929 |
| 1,889,120 | Donovan | Nov. 29, 1932 |
| 2,459,938 | Higgins | Jan. 25, 1949 |